US008488200B2

(12) United States Patent
Polus et al.

(10) Patent No.: US 8,488,200 B2
(45) Date of Patent: Jul. 16, 2013

(54) SYSTEM AND METHOD FOR REPRODUCING IMAGES ONTO SURFACES

(75) Inventors: Jeffrey E. Polus, Hillsboro, IL (US); V. Blake Slaughter, Manchester, MO (US); Jeffrey D. Brehm, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 1218 days.

(21) Appl. No.: 11/584,922

(22) Filed: Oct. 20, 2006

(65) Prior Publication Data

US 2007/0103467 A1 May 10, 2007

Related U.S. Application Data

(63) Continuation-in-part of application No. 11/112,698, filed on Apr. 21, 2005, now abandoned.

(51) Int. Cl.
*G06T 15/50* (2006.01)

(52) U.S. Cl.
USPC ......... 358/3.24; 345/419; 345/426; 358/1.19; 399/103; 399/149; 399/153; 702/35; 702/40

(58) Field of Classification Search
USPC ........... 345/419, 426; 358/1.9, 3.24; 382/103, 382/149, 153; 702/35, 40
See application file for complete search history.

(56) References Cited

U.S. PATENT DOCUMENTS

| | | | | |
|---|---|---|---|---|
| 5,204,055 | A * | 4/1993 | Sachs et al. | 419/2 |
| 6,360,656 | B2 * | 3/2002 | Kubo et al. | 101/35 |
| 7,349,123 | B2 * | 3/2008 | Clarke et al. | 358/1.9 |
| 2003/0033104 | A1 * | 2/2003 | Gooche | 702/95 |
| 2006/0238815 | A1 | 10/2006 | Polus | |
| 2007/0103467 | A1 | 5/2007 | Polus et al. | |

* cited by examiner

*Primary Examiner* — Peter K Huntsinger
(74) *Attorney, Agent, or Firm* — Parsons Behle & Latimer

(57) ABSTRACT

Systems and methods of reproducing images onto surfaces are disclosed. In one embodiment, the system includes an image file that digitally produces a planar surface normal to a surface of a master model. The planar surfaces are referenced to a coordinate system of the master model through a series of points. A tracker surfacing system, comprising a tracking instrument, generates and emits a signal as the tracking instrument crosses the planar surface. An output device is actuated by the tracking device as it crosses the planar surface, reproducing the series of points as an image onto a surface, including a flat, curved or compound surface. Both the spatial position and orientation of the output device are detected and adjustments are made so that the image is precisely applied to intended locations on the surface being imaged.

24 Claims, 6 Drawing Sheets

SYSTEM AND METHOD FOR REPRODUCING IMAGES ONTO SURFACES

CROSS REFERENCE TO RELATED APPLICATIONS

This application is a continuation-in-part of U.S. patent application Ser. No. 11/112,698, filed Apr. 21, 2005 now abandoned.

BACKGROUND OF THE INVENTION

1. Field of the Invention

This invention generally relates to systems that reproduce images, and more specifically, to systems that reproduce images onto surfaces, including compound curved surfaces.

2. Description of the Related Art

Complex surfaces, including small components such as mechanical parts or large objects such as buildings, have traditionally been mapped using standard methods, including mylar transfer templates, theodolites laser trackers, and more recently, laser projectors. Generally, these methods are time consuming, tedious and may lack accuracy. For example, a laser projector may be used to project two-dimensional images onto a contoured surface. The projected images are used as patterns for manufacturing products and locating an image onto a desired location. For example, an image may be projected onto a ply manufactured for airplane fuselages, and the like. To be effective, the laser emitter must generally be positioned in an accurate and precise manner. The projector's designated points and angles, however, may not be accurately controlled. It becomes necessary to use multiple laser projector heads to accurately project the lines in their proper location, the larger the projected image and the more complex the surface it is to be projected upon. In addition, the focal length of the laser may be hindered by physical objects, i.e. floors, walls, support posts, & ceilings. If the projection head can not be placed far enough away from the object, it will be unable to project over the entire surface thus requiring more equipment or additional set-ups.

Recently, theodolites have been employed to provide for greater accuracy in determining the coordinates of the reference marks. A theodolite is a mounted optical instrument, which measures horizontal and vertical angles in space. Though it may accurately define a point from the horizontal and vertical angles of a surface relative to a given coordinate system, it typically does not indicate the object geometry, including shape, dimension, and location. Generally, a theodolite is fairly expensive, time consuming and labor intensive. Moreover, current methods of mapping complex surfaces lack the ability to print images onto complex contoured surfaces that have no physical points of reference.

A further problem in mapping and marking surfaces relates to the need to properly position and orient surface marking devices such as a printer, so that the markings are precisely applied at the correct locations on the marking surface. In those cases where a surface mounted printer is used, the feet or legs of the printer rest on the surface to be marked, which may be irregular where the surface includes compound curves. As a result, the firing column of the printing device is not perpendicular to the marking surface, causing error in the position of the applied markings.

Accordingly what is needed is a system and method for reproducing images onto surfaces in which both the spatial position and orientation of an image producing device, such as a printer, is known relative to a surface that is to be imaged or marked. The invention is directed toward satisfying this need.

BRIEF SUMMARY OF THE INVENTION

The invention is directed to systems and methods of reproducing images onto surfaces. Embodiments of the invention generally provide a method of outputting images, including lines, cross hairs and text, onto complex surfaces, including complex contoured surfaces.

In accordance with once aspect of the invention, a system is provided for reproducing an image onto a surface, comprising an imaging device for directing an image onto the surface at a predetermined location, and a device for determining the orientation of the imaging device relative to a desired orientation and for adjusting the device orientation such that the image is reproduced at the predetermined location on the surface. The imaging device may include a printer mounted on and movable over the surface. The device for determining and adjusting the printer orientation may include targets carried on the printer and a tracker for tracking the position and orientation of the targets. At least three of the targets are arranged in a plane whose orientation is determined relative to a plane on the surface to be imaged.

In accordance with another aspect of the invention, a method is provided for reproducing an image onto a surface, comprising the steps of: moving an image device over the surface; determining the spatial position of the imaging device as the device moves over the surface; determining the orientation of an axis of a firing column of the imaging device along which portions of an image are directed onto the surface; adjusting the orientation of the firing column axis before the image portions are directed onto the surface; and, directing portions of the image onto the surface using the imaging device.

Other features, benefits and advantages of the invention will become apparent from the following description of the invention, when viewed in accordance with the attached drawings and appended claims.

BRIEF DESCRIPTION OF THE SEVERAL VIEWS OF THE DRAWINGS

Preferred and alternate embodiments of the invention are described in detail below with reference to the following drawings.

DETAILED DESCRIPTION OF THE INVENTION

The invention relates to systems and methods for reproducing images onto surfaces. Many specific details of certain embodiments of the invention are set forth in the following description and in FIGS. 1-13 to provide a thorough understanding of such embodiments. One skilled in the art, however, will understand that the invention may have additional embodiments, or that the invention may be practiced without one or more of the details described in the following description.

In general, embodiments of methods and systems in accordance with the invention may be used for reproducing images onto a variety of surfaces. The surfaces may include relatively simple contoured surfaces, or compound contoured surfaces, including surfaces encountered in aeronautical, automotive, and marine applications. In further embodiments, the surfaces may include relatively flat surfaces, including, for example, signs, billboards, and any other suitable surfaces.

Figure 1:
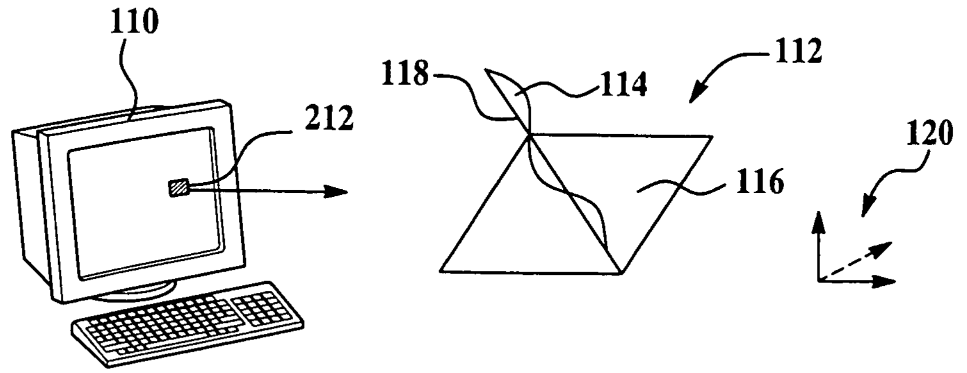
FIG. 1 is a schematic view of the system for reproducing images onto surfaces, according to one embodiment of the invention.

FIG. 1 is a schematic view of a system for reproducing images onto surfaces 100, including compound contoured surfaces. The system may include an operating interface 110 comprising a computer, such as a desktop, laptop, or any other suitable interface device. The operating interface 110 may be used to produce and store an image file 112. In one embodiment, the image file 112 may comprise a digitally produced igs (image grayscale system) file, or other suitable digital file. An igs file may display a full range of black and white images, including various shades of gray. The image file 112 may then be adapted to digitally produce a planar surface 114 normal to a surface of a master model by extruding the line created from the intersection of the edge of a modeled part and the digital master model surface 116.

The planar surface 114 may be extruded from the surface of a master model 116, such as a mechanical part like an aircraft stiffener, for example, to a plane 118 normal to the outer mold of the master model. The resulting extruded planar surface 114 may be referred to as a "fence file". The extruded planar surface (i.e. fence file) 114 may appear to look like a ribbon, following the contours of the master model 116 created by extruding the lines normal to the surface of the master model 116. These surfaces 114 may be referenced to a coordinate system 120 of the master model 116 through a series of points (not shown). In one particular embodiment, the coordinate system 120 may comprise a Cartesian coordinate system. In alternate embodiments, the coordinate system 120 may include a two-intersecting planar system, a three-intersecting planar system, or any other suitable coordinate system.

Figure 2:
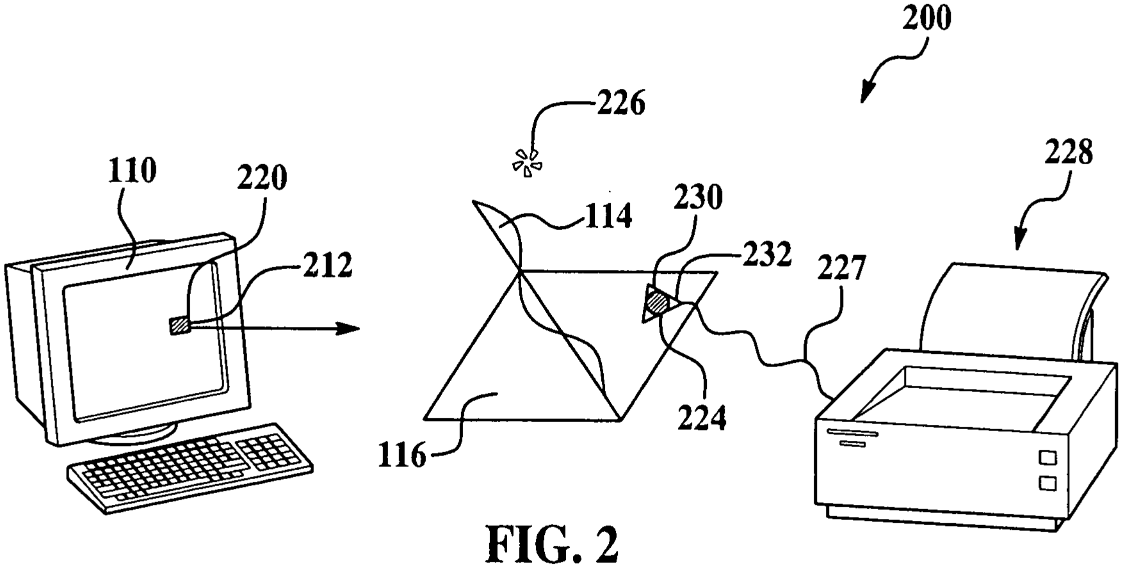
FIG. 2 is a schematic view of the system for reproducing images onto surfaces, according to another embodiment of the invention.

FIG. 2 is a schematic view of another embodiment of the invention. In addition to producing and storing the image file 112, the operating interface 110 may comprise a tracker surfacing system 220, which may include a design program 212. In one embodiment, the design program 212 may include a computer aided design program (CAD) that can model surfaces via a computer. The CAD program may, for example, be a commercially available program, including the Unigraphics° program available from Electronic Data Systems Corporation of Plano, Tex., the CATIA® program available from Dassault Systems Corporation of Suresnes, France, or any other suitable CAD program. The CAD program may be adapted to convert the "blueprint" drawings to create two-dimensional (2-D) drawings or three-dimensional (3-D) models. The design program 212 may further include a Computer-Aided Inspection Program, including, for example, the VERISURF® Computer Aided Inspection Program commercially-available from Verisurf Software, Inc. of Anaheim, Calif. The Computer Aided Inspection Program compares actual readings from an actual device to theoretical designed model surfaces.

Still referring to FIG. 2, the tracker surfacing system 220 may also include a tracking instrument 224. The design program 212 may be adapted to generate and emit a signal 226 as the tracking instrument 224 crosses the extruded plane (or fence file) 114. In one particular embodiment, the tracking instrument 224 may include a tracker ball and may use software that samples how close the center (0, 0, 0) of the tracker ball 225 is to the extruded fence file 114. As the center of the ball crosses the extruded plane 114, the tracking instrument 224 may emit an electrical signal. In one embodiment, the signal 226 may be transmitted via a cable 227 to an output device 228. In another embodiment, the signal 226 may be transmitted via electromagnetic waves, acoustic signals, optical signals, or any other suitable means. In operation, the crossing of the tracking instrument 224 over the planar surface 114 may actuate the output device 228. More specifically, in one particular embodiment, the output device 228 may include an ink jet printer, and the tracking instrument 224 may emit an electrical signal that triggers the ink jet to fire. If necessary, the ink jet may be set to fire numerous shots in quick succession. The output device 228 may be used to reproduce the series of points of the master model 116 onto a surface (not shown). The output device 228 may include a printer, scanner, facsimile, laser, electron beam, computer display, and other suitable device.

Figure 6:
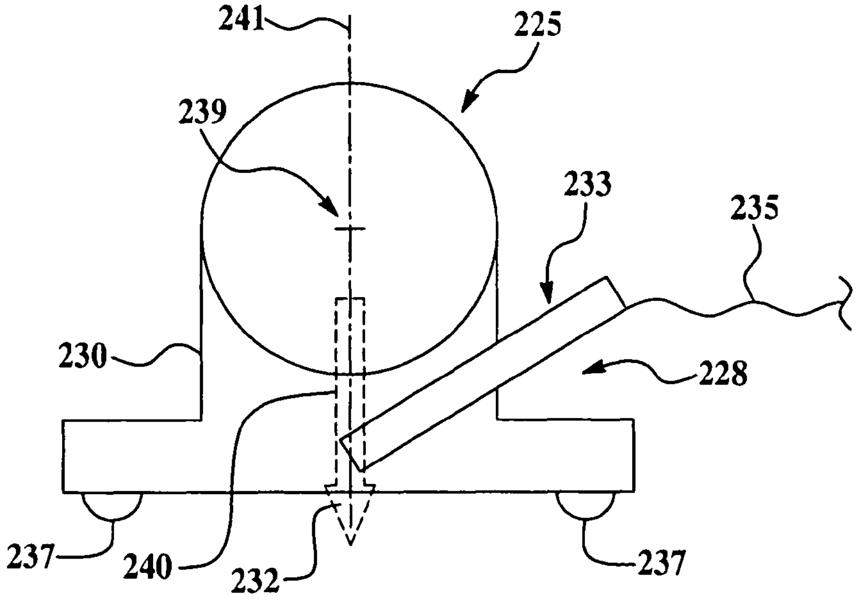
FIG. 6 is a side cross-sectional view of a tracking instrument in accordance with an embodiment of the invention.

In an alternate embodiment, the output device 228 may be mechanically coupled to the tracking instrument 224. For example, FIG. 6 is a side cross-sectional view of a tracking instrument 224 in accordance with an embodiment of the invention. In this embodiment, the tracking instrument 224 may include a housing member 230 that operatively supports a tracking ball 225 and an output device 228. In alternate embodiments, the tracking instrument 224 may include a laser tracking ball, a laser tracker projector, or any other suitable tracker surfacing instruments. The output device 228 may include an ink jet head 232 coupled to an ink reservoir 233. A power lead 235 provides power to the output device 228, and feet (or rollers) 237 support the housing 230. As further shown in FIG. 6, a center point 239 of the tracking ball 225 may be aligned with the ink jet head 232 along a tracking axis 241.

Figure 3:
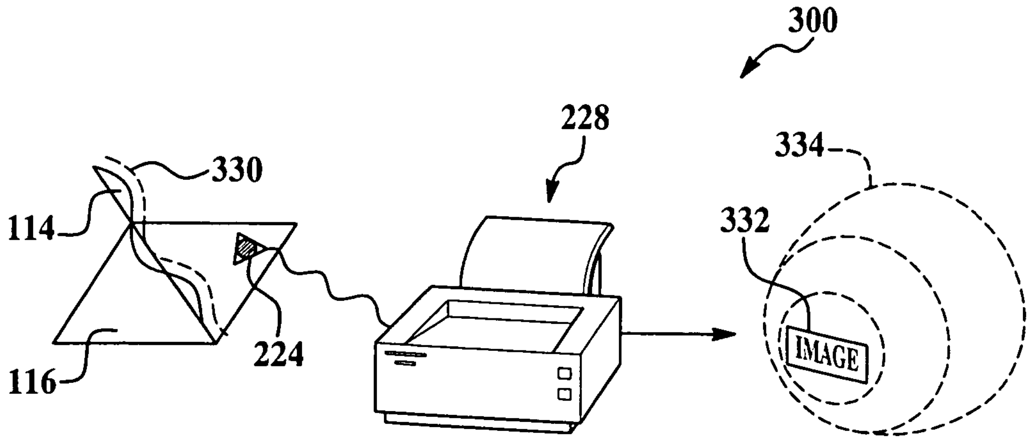
FIG. 3 is a schematic view of a system for reproducing images onto surfaces, according to yet another embodiment of the invention.

Referring to FIG. 3, a tracking instrument 224 may track the extruded plane 114, as previously described with reference to FIG. 2. As the tracking instrument 224 tracks the planar surface 114, the tracking instrument 224 may actuate the output device 228 to reproduce the series of points 330 of the master model. In one particular embodiment, as the tracking instrument 224 is passed over the planar surface 114 at different locations, a point 330 may be produced at each intersection (not shown). The series of points 330 may then be reproduced as an image 332 onto a surface 334, including onto a flat, curved, or compound surface.

Figure 4:
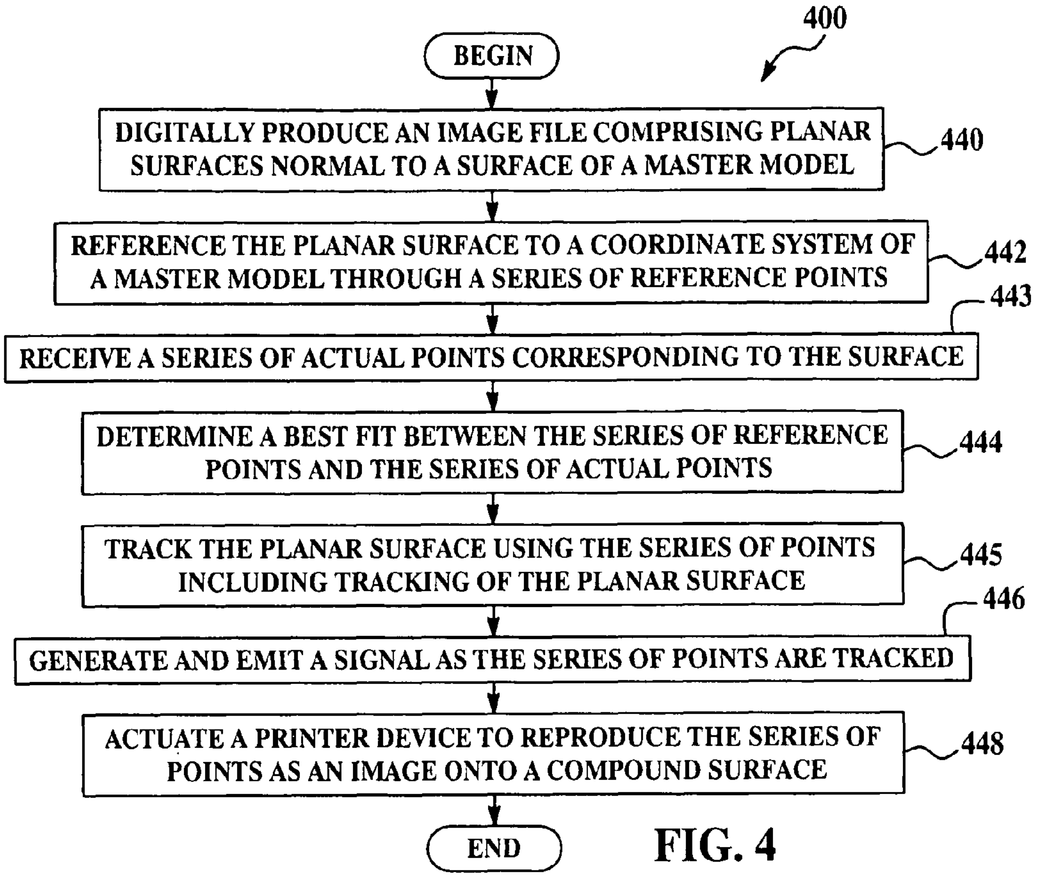
FIG. 4 is a block diagrammatic view of a method of reproducing images onto surfaces, according to an embodiment of the invention.

FIG. 4 is a block diagrammatic view of a method of reproducing images onto surfaces. At block 440, an image file comprising planar surfaces normal to a surface of a master model may be digitally produced. The image file may be digitally produced by an interface operator 110, as previously described with reference to FIG. 1. The master model may then be referenced, at a block 442, in a coordinate system through a series of reference points that are coordinated between the actual part and the digital model. At block 443, the actual points are imported into the digital model, and at block 444, a best fit between the two sets of reference points is determined. At block 445, the series of reference points may be used to track the planar surface extruded from the master model. A tracking instrument, as previously described with reference to FIG. 2 and FIG. 3, may be employed to track the planar surface. As the series of reference points are tracked, a signal may be generated and emitted at block 446 by a design program, such as a CAD program. An output device (e.g. a printer) is actuated, at block 448, by the tracking instrument to reproduce the series of reference points as an image onto a surface. In particular embodiments of the invention, the surfaces may include contoured surfaces and compound contoured surfaces, including aeronautical, automotive, and marine surfaces. In alternate embodiments, the surfaces may include relatively flat surfaces, including, for example, signs, billboards, stadium grounds art and layouts, and any other suitable applications.

Figure 5:
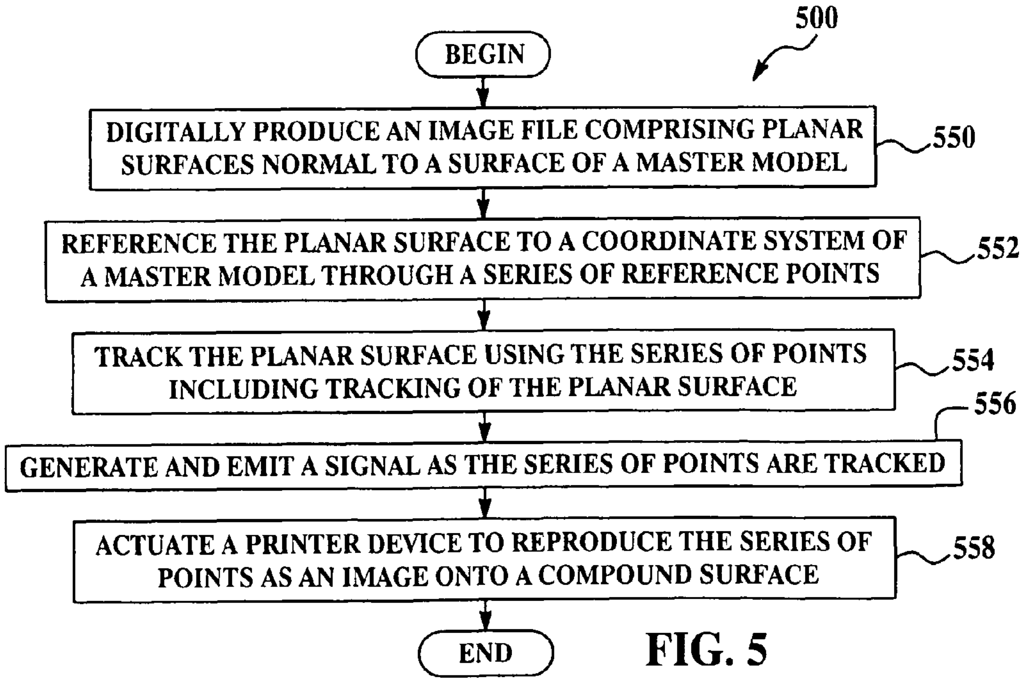
FIG. 5 is a block diagrammatic view of a method of reproducing images onto surfaces according to yet another embodiment of the invention.

FIG. 5 is a block diagrammatic view of a method of reproducing images onto surfaces, according to another embodiment of the invention. At block 550, an image file comprising planar surfaces normal to a surface of a master model may be digitally produced. The master model may then be referenced, at block 552, in a coordinate system through a series of points. At block 554, the series of points may be used to track the planar surface extruded from the master model. A tracking instrument, as previously described with reference to FIG. 2 and FIG. 3, may be employed to track the planar surface. As the series of points are tracked, a signal may be generated and emitted at block 556 by a design program, such as a CAD program. An output device may be actuated, at block 558, by the tracking device to provide an image onto a surface, such as a surface of a vehicle. In alternate embodiments, as described above with respect to the method 400 shown in FIG. 4, a series of actual points may be imported into the digital model (block 443), and a best fit between the two sets of points may be determined (block 444).

A problem arises when either the output device 228 is not properly positioned in space relative to the location of the surface to be marked, or the output device 228 is not properly oriented relative to the surface area at the location to be marked. In the embodiment of the tracking device shown in FIG. 6, the output device 228 which may comprise an ink jet printer, may be mounted on a body 230 along with the tracking ball 225. In other embodiments, the ink jet printer or other marking device may be mounted separately from the tracking ball 225. In any event, the output device 228 is usually supported on the surface to be marked by feet, legs or rollers, such as feet 237 shown on FIG. 6. In order to apply marking at precisely the correct locations on the marking surface, it is usually necessary that the axis of the firing column 240 (FIG. 6) of the printer or other output 228 device be oriented normal to the surface where the markings are intended to be applied. However, where the marking surface is not flat, or the operator has improperly positioned the tracking instrument 224 on the surface, one of the supporting feet may not touch the marking surface, causing the firing column 240 of the output device 228 not to be normal (perpendicular) to the marking surface.

Figure 7:
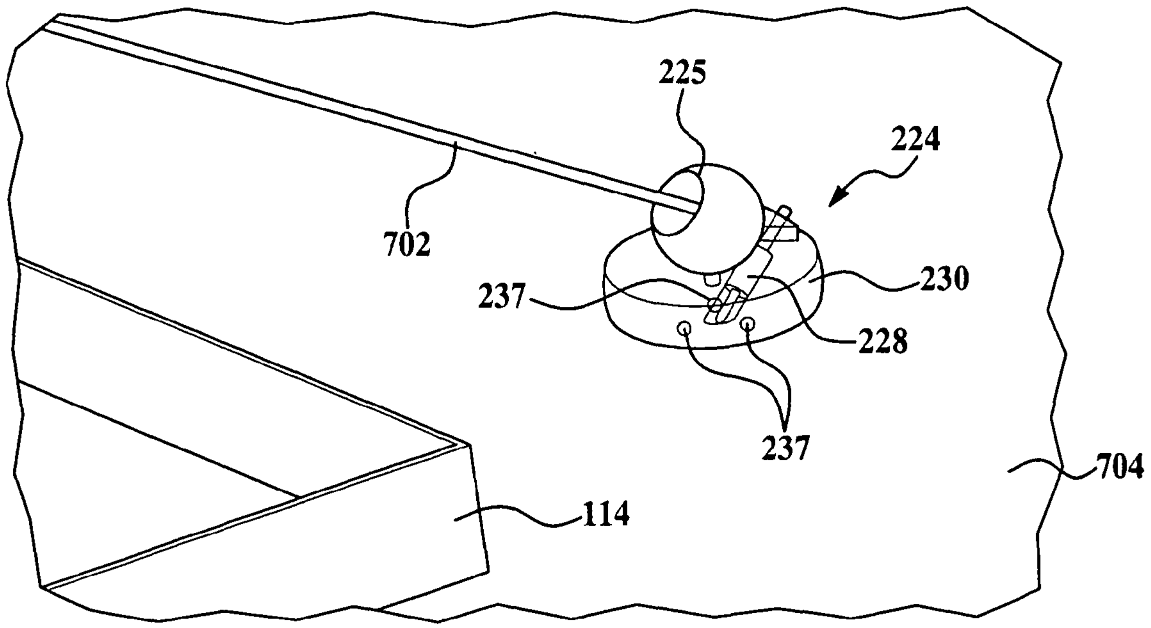
FIG. 7 is an enlarged, perspective view showing the tracking instrument on the surface relative to a fence file and a laser tracker beam.
Figure 8:
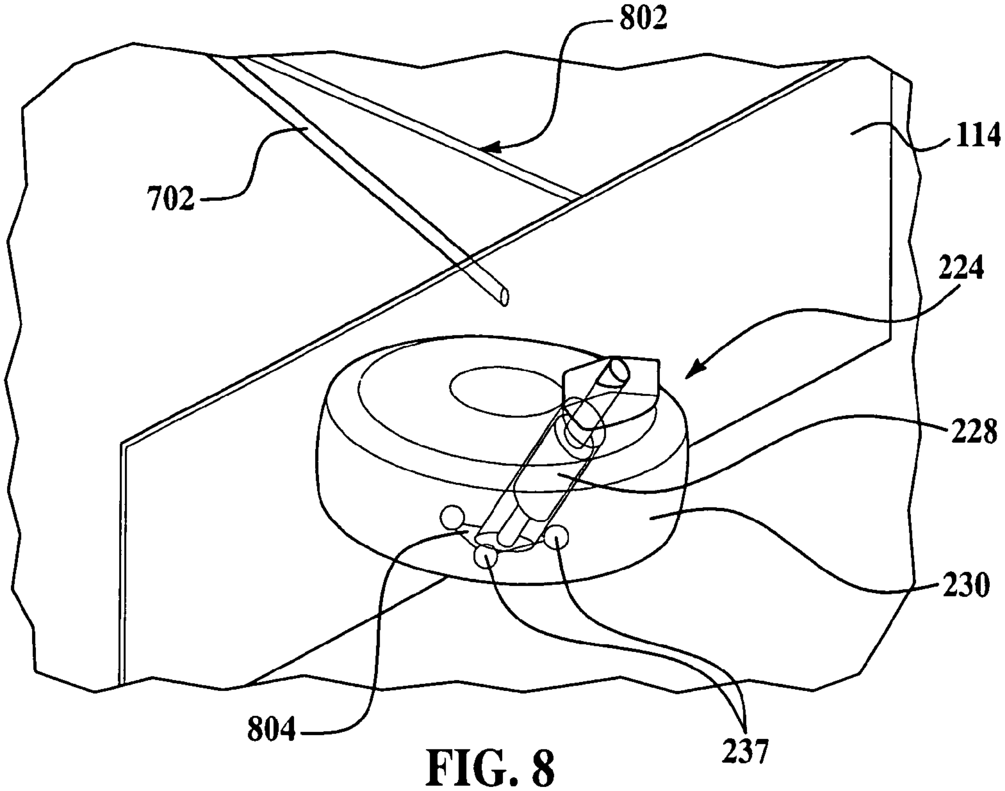
FIG. 8 is an enlarged, perspective view showing the tracking instrument traversing a fence file.

In accordance with the invention, a system and method are provided for assuring that both the spatial position and the orientation of the output device 228 are correct so that the markings are applied at the correct locations on the surface to be marked or marking surface. FIGS. 7 and 8 show the tracking instrument 224 supported on a marking surface 704 to be marked by the feet 237 on the bottom of the body 230. A laser beam 702 from a laser tracker (not shown) may be reflected from the tracking ball 225 so that the position of the tracking instrument 224 can be continuously tracked.

The output device 228, which may comprise an ink jet printer has a firing column 240 along which the imaging ink is deposited onto the marking surface 704. In order to mark the surface 704 at the correct location, the firing column 240 must be normal (i.e. perpendicular) to the marking surface 704. Accordingly, the angle of the firing column 240 relative to the marking surface 704 may be determined by the orientation of the body 230, which in turn is dependent upon the position at which the feet 237 contact surface 704. As best seen in FIG. 8, the feet, all three, 237 define a plane 804. When all feet 237 are properly oriented and in contact with marking surface 704, the plane 804 is parallel to the marking surface 704, and accordingly, a reference axis 802 corresponding to the firing column 240 of the output device 228 is both normal to the plane 804 as well as to the surface 704 at the location to be marked. In the illustrated example, the reference axis 802 extends through the center of the tracking ball 225 and is coaxial with the firing column 240 of the output device 228.

Figure 9:
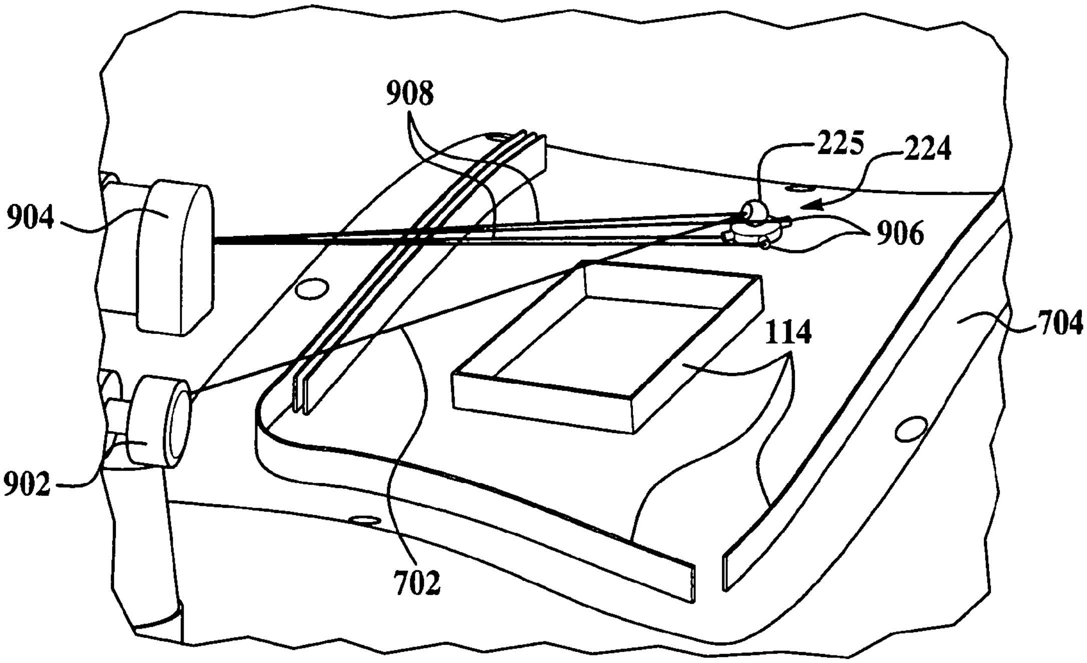
FIG. 9 is a perspective view of the tracking instrument on a surface to be imaged, which includes multiple tracking targets.
Figure 10:
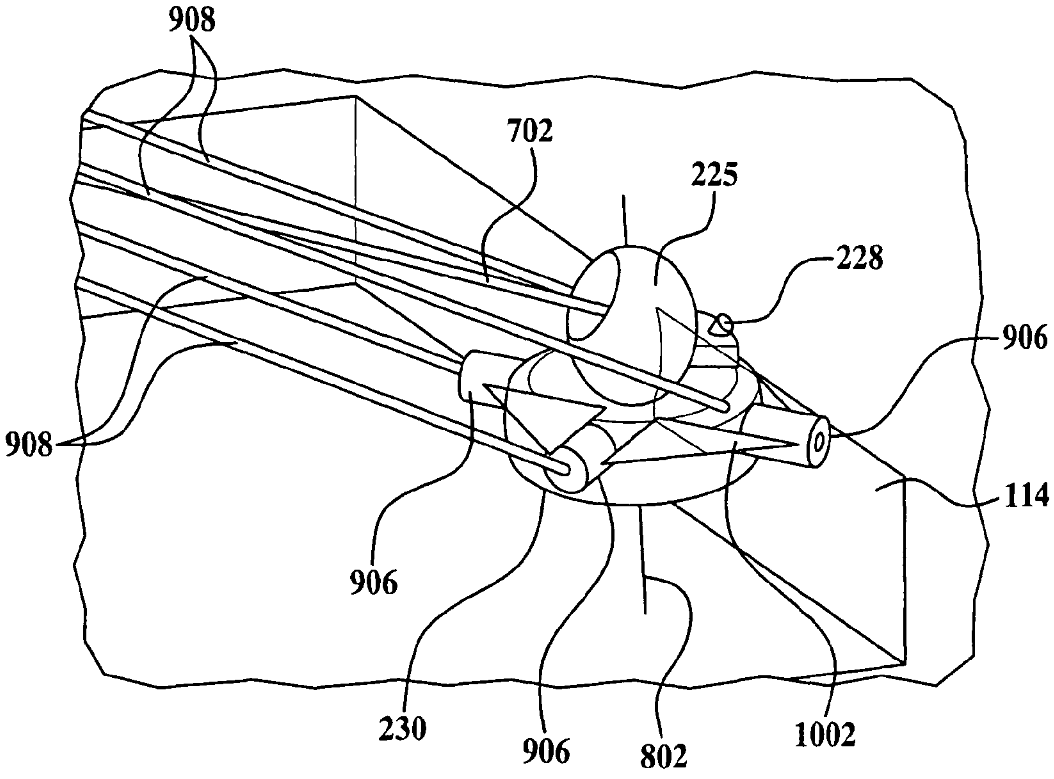
FIG. 10 is an enlarged, perspective view of the tracking instrument shown in FIG. 9, traversing one of the fence files.
Figure 11:
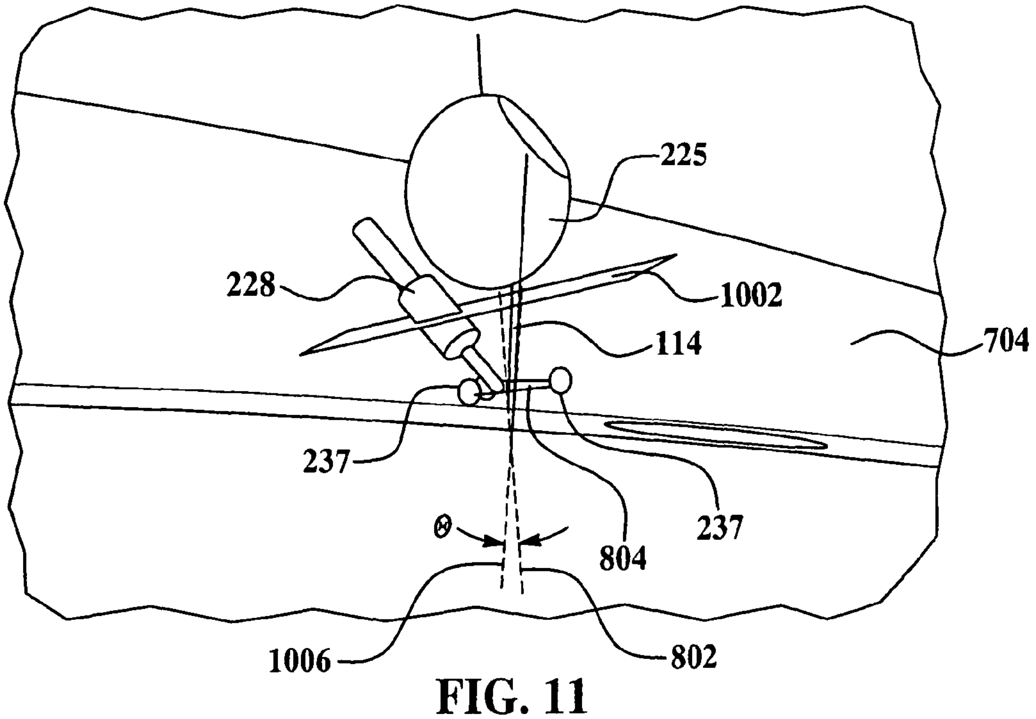
FIG. 11 is a view of portions of the tracking instrument shown in FIGS. 9 and 10, the body not shown for purposes of clarity.

Referring now to FIGS. 9-11, four circumferentially spaced targets 906 may be mounted on the tracking instrument body 230. The targets 906 may be arranged in a common plane 1002 which may be parallel to the plane 804 defined by the feet 237. Accordingly, the reference axis 802 corresponding to the firing column 240 may be normal to plane 1002. A laser tracker 902 emits a beam 702 that may reflect back to the tracker 902 in order to track the position of the tracking instrument 224 in three-dimensional space, in terms of an XYZ coordinate system. For example, a photogrammetry camera 904 may be used to track the position of the targets 906. Camera 906 generates a set of data that is used by a later discussed computer 1202 shown in FIG. 12, to calculate the spatial orientation of the tracking instrument 224, in terms of roll, pitch and yaw for example. Both the laser tracker 902 and the photogrammetry camera 904 are commercially available systems that can be sourced from various suppliers. It should be noted here that although laser tracking and photogrammetry techniques have been specifically disclosed in the illustrated embodiment, a variety of alternative non-contact technologies may be used to determine the position and orientation of the tracking instrument 224.

The laser tracker 902 and photogrammetry camera 904 continuously monitor the position and orientation of the tracking instrument 224, and generate data that may be used by computer 1202 to calculate the angle of the firing column reference axis 802 relative to the marking surface 704. The relationship between the orientation of the tracking instrument 224 and the marking surface 704 is better shown in FIG. 11. As previously described, the plane 804 of the tracking instrument feet 237 extends parallel to the plane 1002 of the laser targets 906. In FIG. 11, one of the three feet 237 is raised slightly off of the marking surface 704, resulting in the firing column reference axis 802 being inclined, rather than normal relative to the marking surface 704. A reference axis 1006 is shown extending through the fence file 114 and is normal to the marking surface 704 at the point at which the tracking ball 225 crosses the fence file 114. It can be seen that the firing column reference axis 802 is inclined at an angle θ relative to the normal axis 1006. The angle θ represents an error in the orientation of the tracking instrument 224 which may be used by the computer 1202 (FIG. 12) to take preventative or corrective action.

Figure 12:
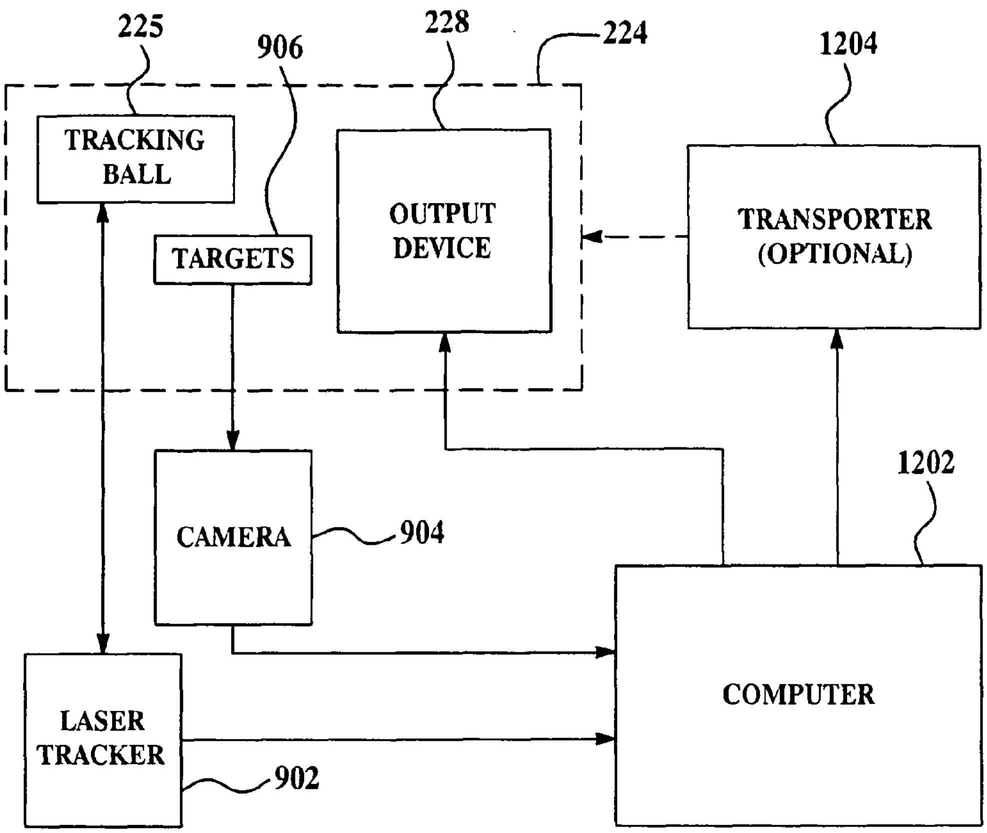
FIG. 12 is a broad block diagram of the system.

Referring now to FIG. 12, the tracking instrument 224 can be seen to include the output device 228 which may comprise an ink jet printer as previously described, as well as the tracking ball 225 and targets 906. The laser tracker 902 may use the tracking ball 225 as a target to develop information identifying the position of the tracking instrument 224 on the marking surface 704, while camera 904 may use the targets 906 to develop data used by computer 1202 to determine the orientation of the tracking instrument 224, which may include roll, yaw and pitch information.

The position and orientation data may be delivered from the laser tracker 902 to computer 1202 which calculates information that may be used to control the output device 228. Specifically, after calculating the position and orientation of the tracking device 224 as well as the angle of the firing column reference axis 802, the computer 1202 may deliver firing signals to the output device 228 as well as control signals that make corrections, if required, in the angle of the firing column 240. As previously mentioned, these firing and control signals are dependent on the calculated orientation of the tracking instrument 224, and the calculated angle of the firing column reference axis 802 relative to the marking surface 704. Thus, for example, if the computer 1202 determines that the tracking instrument 224 orientation is such that the firing column axis 802 is not normal to the marking surface 704 at the point where an image should be reproduced, the computer 1202 either prevents the output device 228 from firing, or issues control signals causing the output device 228 to make angular corrections in the firing column 240 so that dots from the ink jet printer are deposited at the correct location on the marking surface 704.

The tracking instrument 224 may be manually moved over the marking surface 704 by an operator. However, it is also possible to use an automated transporter 1202 or other robotic device to move the tracking instrument 224 according to programmed instructions which may be stored, for example, in the computer 1202. The movement of the tracking instrument 224 by the transporter 1204 is coordinated with the firing and control signals delivered to the output device 228 from the computer 1202.

Figure 13:
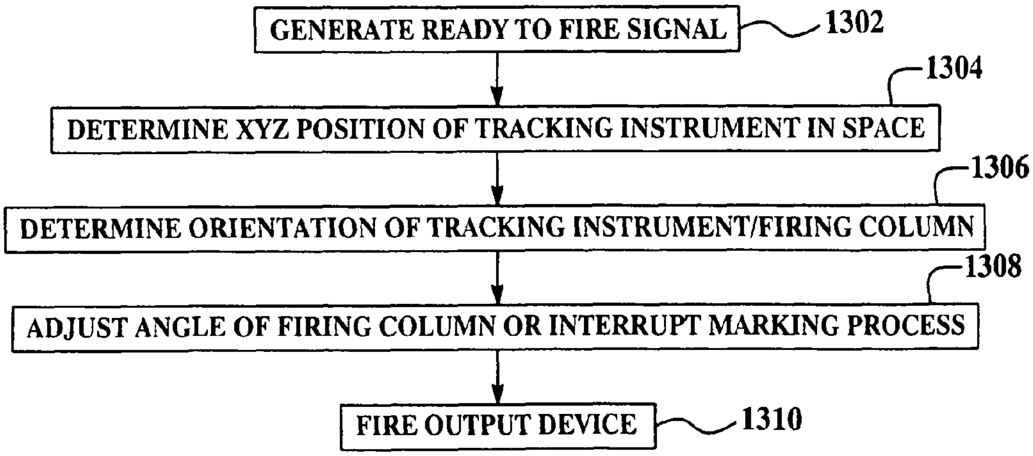
FIG. 13 is a flow chart showing steps for carrying out the method of the invention.

FIG. 13 shows the broad steps of the method which effectively comprises a subroutine of the steps shown in FIGS. 4 and 5. When the tracking instrument 224 crosses a fence file 114, a signal is generated that is intended to actuate the output device 228. In effect, a signal indicating traversal of a fence file 114 is interpreted as a ready to fire signal 1302. However, before the output device 228 is actuated to fire, the XYZ position of the tracking instrument 224 is determined at step 1304 and the orientation of the tracking instrument 224 is determined relative to the marking surface 704 at step 1306. If both the position and orientation of the tracking instrument 224 are determined to be correct, then the output device 228 is fired at step 1310. However, if either the position or orientation of the tracking instrument 224 is incorrect, then either the orientation angle of the firing column 240 is adjusted, or the marking process is stopped to allow operator intervention.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method of reproducing images onto a physical surface, comprising:

using a computer readable digital image file including a master model and digitally producing a fence file, the master model including a contoured surface, the fence file including a plurality of planar surfaces normal to the contoured surface and extruded from a series of reference points on the contoured surface, said master model contoured surface and the fence file being coordinated to said physical surface, said planar surfaces not comprising said master model, the fence file following contours of the contoured surface of said master model;

referencing the fence file to a coordinate system of the master model through the series of reference points, said referencing by a computer executing programmed instructions stored in memory; and adjusting an angular orientation of an output device with respect to said physical surface so that the reference points are reproduced by the output device onto a contoured surface of the physical surface coordinated to the master model contoured surface as the output device crosses a location of the physical surface coordinated to the fence file.

2. The method of claim 1, further comprising:

tracking the fence file using the series of reference points; and emitting a signal as the series of reference points are being tracked.

3. The method of claim 1, further comprising:

determining a spatial position of the output device; and, determining the angular orientation of the output device relative to the physical surface.

4. The method of claim 3, wherein determining the spatial position and angular orientation are each performed using a non-contact tracker.

5. The method of claim 1, further comprising:

determining an orientation of targets located on a tracking instrument; and determining a current orientation of the output device based on the orientation of targets.

6. The method of claim 5, wherein the angular orientation adjustment is based on the current orientation of the output device.

7. The method of claim 1, further comprising determining a spatial position of the output device.

8. The method of claim 7, wherein determining the spatial position is performed using a laser tracker.

9. A method for reproducing an image onto a physical surface, comprising:

determining a spatial position of an imaging device as the imaging device moves over the physical surface, said spatial position determined by generating a computer readable image file including a master model and digitally producing a fence file, the master model including a contoured surface, the fence file including a plurality of planar surfaces normal to the contoured surface and extruded from a series of reference points on the contoured surface, and tracking the spatial position of the imaging device with respect to said fence file, said master model contoured surface and said fence file being coordinated to said physical surface, the fence file not comprising said master model, the fence file following contours of the contoured surface of said master model;

determining an angular orientation of an axis of a firing column of the imaging device along which portions of an image are directed onto the physical surface; and adjusting the angular orientation of the firing column axis so that the image portions are reproduced onto a contoured surface of the physical surface coordinated to the master model contoured surface as the imaging device crosses a location of the physical surface coordinated to the fence file.

10. The method of claim 9, wherein tracking the spatial position is performed by tracking a target mounted for movement with the imaging device.

11. The method of claim 9, wherein tracking the spatial position is performed using a laser tracker.

12. The method of claim 9, wherein determining the angular orientation includes tracking targets on the imaging device using a photogrammetry camera.

13. A system configured to reproduce images onto a physical surface, comprising:

a computer readable image file including a master model and being configured to digitally produce a fence file, the master model including a contoured surface, the fence file including a plurality of planar surfaces normal to the contoured surface and extruded from a series of reference points on the contoured surface, said planar surfaces not comprising said master model, the fence file following contours of the contoured surface of said master model, said master model contoured surface and the fence file being coordinated to said physical surface, the fence file being referenced in a coordinate system of the master model through a series of reference points, said image file processed by a programmed computer;

a device configured to adjust an angular orientation of an output device and so that the series of reference points are reproduced by the output device on a contoured surface of the physical surface coordinated to the master model contoured surface as the output device crosses a location of the physical surface coordinated to the fence file.

14. The system of claim 13, wherein the device configured to adjust angular orientation includes: a tracker configured to generate information related to the orientation of the output device, and said programmed computer configured to receive orientation information from the tracker and generate a set of orientation control signals based on the orientation information received from the tracker, the orientation control signals being used to adjust the orientation of the output device.

15. The system of claim 14, wherein: the output device includes a reference axis defining a firing column along which the points are directed onto the physical surface, and the orientation adjusting device includes a set of tracking targets configured to move along with the output device and arranged in a plane.

16. The system of claim 15, wherein the programmed computer is configured to determine the orientation of the plane relative to the physical surface onto which the points are to be reproduced.

17. The system of claim 14, wherein the tracker comprises at least one of a laser tracking ball and a laser tracking projector.

18. A system configured to reproduce an image onto a physical surface, comprising:

an imaging device in communication with a programmed computer configured to reproduce an image onto a contoured surface of the physical surface, the contoured surface being determined by said computer processing a computer readable image file, said image file including a master model and being configured to digitally produce a fence file, the master model including a contoured surface, the fence file including a plurality of planar surfaces normal to the master model contoured surface and extruded from a series of reference points on the master model contoured surface, said master model contoured surface and said fence file being coordinated to said physical surface, the fence file following contours of the contoured surface of said master model, said computer configured to track a spatial position of the imaging device with respect to said reference points; and a device in communication with said computer, said computer configured to determine the spatial position and an angular orientation of the imaging device relative to said physical surface, and to adjust the angular orientation such that the image is reproduced on the contoured surface of the physical surface coordinated to the master model contoured surface as the imaging device crosses a location of the physical surface coordinated to the fence file.

19. The system of claim 18 wherein: the imaging device includes a printer mounted on and movable over the physical surface, and the device in communication with the computer includes targets carried with the printer, and a tracker configured to track the position and orientation of the targets.

20. The system of claim 19, wherein: the targets include at least three targets arranged in a plane, and the device in communication with the computer is configured to determine the angle of the plane relative to a plane on the physical surface.

21. The system of claim 19, wherein the orientation determining and adjusting device includes said programmed computer configured to calculate the orientation of the targets relative to the physical surface.

22. The system of claim 18, wherein the imaging device includes a printer configured to print the image onto the physical surface.

23. The system of claim 18 further comprising:

a tracker surfacing system comprising a design program and a tracking instrument, the design program processed by said programmed computer and adapted to generate and emit a signal as the tracking instrument crosses the fence file, and wherein the imaging device is coupled to and actuated in response to the tracking instrument.

24. The system of claim 18 wherein the device in communication with the computer includes said programmed computer configured to calculate the difference between a current orientation of the imaging device and the desired orientation of the imaging device, and to control the operation of the imaging device.

* * * * *